US007442232B2

(12) United States Patent
White et al.

(10) Patent No.: US 7,442,232 B2
(45) Date of Patent: Oct. 28, 2008

(54) ADSORBENTS, METHODS OF PREPARATION, AND METHODS OF USE THEREOF (75) Inventors: Mark G. White, Woodstock, GA (US); Alexei V Iretski, Sault Sainte Marie, MI (US); Scott Jeffrey Weigel, Allentown, PA (US); Robert Ling Chiang, Basking Ridge, NJ (US); Jeffrey Richard Brzozowski, Kunkletown, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 443 days.

(21) Appl. No.: 10/518,188

(22) PCT Filed: Jun. 19, 2003

(86) PCT No.: PCT/US03/19290

§ 371 (c)(1),
(2), (4) Date: Jan. 18, 2006

(87) PCT Pub. No.: WO04/000440

PCT Pub. Date: Dec. 31, 2003

(65) Prior Publication Data

US 2006/0144227 A1 Jul. 6, 2006

Related U.S. Application Data (60) Provisional application No. 60/390,050, filed on Jun. 19, 2002, provisional application No. 60/449,689, filed on Feb. 24, 2003.

(51) Int. Cl.
*B01D 53/04* (2006.01)
(52) U.S. Cl. .............................. 95/96; 95/139; 95/900; 423/230; 502/56; 502/103
(58) Field of Classification Search .................. 95/96, 95/106, 115, 118–120, 126, 139, 900; 423/230; 502/34, 56, 102, 103, 414
See application file for complete search history.

(56) References Cited

U.S. PATENT DOCUMENTS

| 1,831,731 | A | 11/1931 | Al |
| 3,141,729 | A | 7/1964 | Clarke et al. ..................... 23/4 |
| 3,511,595 | A | 5/1970 | Fuchs ............................... 53/4 |
| 3,865,924 | A | 2/1975 | Gidaspow et al. ........... 423/230 |
| 4,201,751 | A | 5/1980 | Holter et al. ................ 423/210 |
| 4,433,981 | A | 2/1984 | Slugh et al. ..................... 55/59 |
| 4,493,715 | A | 1/1985 | Hogan et al. ................ 423/230 |
| 5,091,358 | A | 2/1992 | Birbara et al. ............... 502/412 |
| 5,114,898 | A | * 5/1992 | Pinnavaia et al. ........... 502/406 |
| 5,186,727 | A | 2/1993 | Chang ............................ 55/35 |
| 5,214,019 | A | 5/1993 | Nalette et al. ................ 502/400 |
| 5,256,172 | A | 10/1993 | Keefer .......................... 423/230 |
| 5,454,968 | A | 10/1995 | Nalette et al. ................ 252/192 |
| 5,520,894 | A | 5/1996 | Heesink et al. .............. 423/230 |
| 5,681,503 | A | 10/1997 | Nalette et al. ................ 252/192 |
| 5,980,856 | A | 11/1999 | Okada et al. ................. 423/600 |
| 6,024,781 | A | 2/2000 | Bulow et al. ................... 95/101 |
| 6,143,057 | A | 11/2000 | Bulow et al. .................... 95/96 |
| 6,271,172 | B2 | 8/2001 | Ohashi et al. ................ 502/400 |
| 6,280,503 | B1 | 8/2001 | Mayorga et al. ................ 95/96 |
| 6,293,998 | B1 | 9/2001 | Dolan et al. ..................... 95/96 |
| 6,309,445 | B1 | 10/2001 | Gittleman et al. ............... 95/96 |
| 6,315,973 | B1 | 11/2001 | Nataraj et al. ............. 423/418.2 |
| 6,432,171 | B1 | 8/2002 | Kumar et al. .................. 95/120 |
| 6,506,236 | B2 | 1/2003 | Golden et al. ................. 95/129 |
| 6,599,347 | B2 | 7/2003 | Kalbassi et al. ................. 95/10 |
| 2001/0001782 | A1 | 5/2001 | Ohashi et al. ................ 502/400 |
| 2003/0047488 | A1 | 3/2003 | Takehira et al. ............. 208/137 |

OTHER PUBLICATIONS

Publication No. 2003/0047488A1, Published Mar. 13, 2003; Takehira, et al.; Catalyst For Reacting Hydrocarbon With Steam a nd Process for Producing Hydrogen from Hydrocarbon.
J.J. Berzelius; Complex or Double Salts with Magnesium Carbonate; Magnesium, V. 4, 1922-1397, no date given.
Iretskii, et al.; Bimonthly Report for Improved $CO_2$ Adsorbent; Dec. 2000.
Bellotto, et al.; A Reexamination of Hydrotalcite Crystal Chemistry; J. Phys. Chem.; 1996; 100, 8527-8534.
Sels, et al.; Hydrotalcite-Like Anionic Clays in Catalytic Organic Reactions; Catalysis Reviews, 43(4); 443-488; 2001.
Bellotto, et al.; Hydrotalcite Decomposition Mechanism; A Clue to the Structure and Reactivity of Spinel-like Mixed Oxides; J. Phys. Chem.; 1996; 100; 8535-8542.
Gomes, et al.; Pressure Swing Adsorption for Carbon Dioxide Sequestration From Exhaust Gases; Separation and Purification Technology 28 (2002; 161-171.
Hasegawa, et al.; The Separation of $CO_2$ using Y-type Zeolite Membranes Ion-Exchanged with Alkali Metal Cations; Separation and Purification Technology; 22-23 (2001); 319-325.
Takamura, et al.; Evaluation of Dual-Bed Pressure Swing Adsorption for $CO_2$ Recovery From Boiler Exhaust Gas; Separation and Purification Technology 24 (2001); 519-528.
Allada, et al.; Thermochemistry and Aqueous Solubilities of Hydrotalcite-Like Solids; Science; vol. 296, Issue 5568, 2002; p. 721.
Sanchez-Camazano, et al.; Hydrotalcites and Organo-Hydrotalcites as Sorbents for Removing Pesticides From Water; Journal of Environmental Science & Health, vol. B33; Issue 3, 1998; p. 509.
Gambini, et al.; $CO_2$ Emission Abatement From Fossil Fuel Power Plants by Exhaust Gas Treatment; Journal of Engineering For Gas Turbines & Power, vol. 125; Issue 1; 2003; p. 365.

* cited by examiner

*Primary Examiner*—Frank M Lawrence
(74) *Attorney, Agent, or Firm*—Thomas, Kayden, Horstemeyer & Risley, LLP (57) ABSTRACT Adsorbents and methods of use thereof are provided. One representative, among others, includes an adsorbent having an alkali metal promoted, mixed trivalent layered double hydroxide (LDH) composition. When the mixed trivalent layered double hydroxide (LDH) composition is heated to a temperature ranging from about 300° C. to 450° C., an the adsorbent having an adsorption capacity of at least 0.8 millimoles of $CO_2$ adsorbed per gram of adsorbent is formed.

20 Claims, 1 Drawing Sheet

FIG. 1

ADSORBENTS, METHODS OF PREPARATION, AND METHODS OF USE THEREOF

CROSS-REFERENCE TO RELATED APPLICATION

This application claims priority to copending U.S. Provisional Application entitled, "Improved High Temperature $CO_2$ Absorbent", filed with the United States Patent and Trademark Office on Jun. 19, 2002, and assigned Ser. No. 60/390,050, and, U.S. Provisional Application entitled, "Temperature Swing Process for Selectively Removing Carbon Dioxide from a Process Stream", filed with the United States Patent and Trademark Office on Feb. 24, 2003, and assigned Ser. No. 60/449,689 both of which are entirely incorporated herein by reference.

TECHNICAL FIELD

The present invention is generally related to separation techniques and, more particularly, is related to adsorbents and precursors thereof, used in separation techniques.

BACKGROUND OF THE INVENTION

The sorption of pollutants on adsorbents is receiving increased attention both from the view of removal and recovery of pollutants from gas mixtures, especially the pollutants produced through combustion processes. The generation and discharge of carbon dioxide into the atmosphere due to the consumption of large quantities of fossil fuels has emerged as a significant pollution problem for the environment. Thus, studies are in progress increasingly to address this issue.

Moreover, the removal of carbon dioxide is also important in several gas purification operations, such as, the production of hydrogen gas, landfill and natural gas treatment, and in the purification of hydrocarbons. Various separation techniques are applicable for the removal of carbon dioxide, such as, adsorption, absorption, and membrane separation.

Processes based on the selective adsorption of a gas mixture generally involve contacting the gas mixture with the selective adsorbent in an adsorption zone. The adsorption zone is maintained at adsorption conditions (i.e., temperature and/or pressure) favorable to selectively adsorbing a component of the gas mixture and producing an adsorption effluent, which has a reduced concentration of the adsorbed component relative to the gas mixture. Subsequently, the adsorbable component is then desorbed by changing the conditions in the adsorption zone to induce desorption. Alternatively, the selective adsorbent can be moved from the adsorption zone to a desorption zone having conditions favorable for desorption. Under desorption conditions the adsorbable component is purged from the selective adsorbent. Following the desorption step, the adsorption zone is purged to remove the adsorbed component.

In general, there are three types of adsorption/desorption processes, and these include pressure swing adsorption, thermal (or temperature) swing adsorption, and combinations thereof.

In pressure swing adsorption (PSA) processes the gas mixture is fed to at least one of a plurality of adsorption zones having an adsorbent at a reduced pressure effective to adsorb at least one component of the gas mixture. After a defined time, the feedstream to the gas mixture is terminated and the adsorption zone is depressurized. Alternatively, the adsorbent can be moved into a desorption zone. In either case, the pressure is elevated to a defined level, which permits the separated adsorbed component to be drawn off.

In thermal swing adsorption (TSA) processes, the gas mixture is fed to at least one of a plurality of adsorption zones having an adsorbent at a reduced temperature effective to adsorb at least one component of the gas mixture. After a defined time, the feedstream to the adsorbent is terminated and the temperature in the adsorption zone is increased. Alternatively, the adsorbent is moved to a desorption zone. In either case, the temperature is increased to a defined level, which permits the adsorbed component to be drawn off. In a typical TSA process, two or more adsorption zones and two or more desorption zones are operated in an alternating manner to provide continuous treatment.

Various classes of adsorbents are known to be suitable for use in PSA and TSA systems, the selection of which is dependent upon the gas mixture components and other factors generally known to those skilled in the art. In general, suitable adsorbents include molecular sieves, silica gel, Y-type zeolite, X-type zeolite, activated carbon, and activated alumina.

A key aspect in separating $CO_2$ is the identification of a suitable adsorbent. Although several types of adsorbents may be employed for the adsorption of $CO_2$, important factors for an efficient process include choosing an adsorbent that has strong affinity for $CO_2$ and also has an appropriate sorption capacity as well as desorption capability. Thus, a heretofore unaddressed need exists in the industry for alternative adsorbents that are capable of adsorbing and desorbing $CO_2$.

SUMMARY OF THE INVENTION

Embodiments of the present invention provide for adsorbents and methods of use thereof. One representative embodiment, among others, includes an adsorbent having an alkali metal promoted, mixed trivalent layered double hydroxide (LDH) composition. When the mixed trivalent layered double hydroxide (LDH) composition is heated to a temperature ranging from about 300° C. to 450° C., an adsorbent having an adsorption capacity of at least 0.8 millimoles of $CO_2$ adsorbed per gram of adsorbent is formed.

In another representative embodiment, the alkali metal promoted, mixed trivalent metal LDH composition has the following general formula:

$[M1_{1-x}(M2_yM3_{(1-y)})_x(OH)_2(A)_{x/2}\cdot zH_2O]\cdot v[M4_wCO_3]$ wherein the subscript "x" is a number between 0 and 1; the subscript "y" is a number ranging from greater than 0 to about 0.05; "z" is a number ranging from 0 to about 8; the subscript "w" is the integer 1 or 2, wherein when "w" is the integer 1 the $CO_3$ becomes $HCO_3$; "v" is a number ranging from 0 to about 0.01; "M1" is a divalent metal selected from magnesium (Mg), calcium (Ca), strontium (Sr), manganese (Mn), iron (Fe), cobalt (Co), nickel (Ni), copper (Cu), and zinc (Zn); "M2" and "M3" are each a trivalent metal selected from aluminum (Al), chromium (Cr), Mn, Fe, Co, lanthanum (La), cerium (Ce), galium (Ga), indium (In), the lanthanide series of metals, and mixtures thereof; "A" is an anion selected from $CO_3$, $SO_4$, and $HPO_4$; and "M4" is an alkali metal selected from sodium (Na), potassium (K), robidium (Rb), cesium (Cs), and lithium (Li).

Another embodiment of the present invention provides for methods of separating carbon dioxide from a gas mixture. An exemplary method includes: providing at least one adsorption zone comprising an alkali metal promoted, trivalent metal layered double hydroxide (LDH) adsorbent having an adsorption capacity of at least 0.8 millimoles of $CO_2$ adsorbed per gram of LDH adsorbent; passing the gas mixture comprising water vapor and carbon dioxide through the at least one adsorption zone wherein the alkali metal promoted, mixed trivalent metal LDH adsorbent adsorbs at least part of the carbon dioxide from the mixture to provide a carbon dioxide-depleted gas; and regenerating the alkali metal promoted trivalent metal LDH adsorbent to provide a carbon dioxide-rich gas.

In still another embodiment, the method of separating carbon dioxide from a gas mixture of water vapor and carbon dioxide using an adsorption process includes the steps of: passing the gas mixture comprising water vapor through at least one adsorption zone comprising an alkali metal promoted, mixed trivalent metal layered double hydroxide (LDH) adsorbent wherein the adsorption zone being at a first temperature and a first pressure, and wherein the alkali metal promoted, mixed trivalent metal LDH adsorbent adsorbs at least part of the carbon dioxide from the gas mixture; separating a portion of the carbon dioxide from the gas mixture to form a carbon dioxide-depleted gas; and regenerating the alkali metal promoted, mixed trivalent metal LDH adsorbent, wherein the adsorption zone being at a second temperature and a second pressure. The temperature and pressure can be changed independently of one another.

In still another embodiment, the method of separating carbon dioxide from a gas mixture comprising carbon dioxide and water vapor using an adsorption process includes the steps of: contacting the gas mixture comprising water vapor with alkali metal promoted, mixed trivalent metal layered double hydroxide (LDH) adsorbent having an adsorption capacity of at least 0.8 millimoles of $CO_2$ adsorbed per gram of LDH adsorbent; and separating a portion of the carbon dioxide from the gas mixture.

Other systems, methods, features, and advantages of the present invention will be or become apparent to one with skill in the art upon examination of the following drawings and detailed description. It is intended that all such additional systems, methods, features, and advantages be included within these descriptions, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Adsorbents, methods of preparation thereof, and methods of use thereof, are disclosed. The adsorbents are capable of adsorbing/desorbing carbon dioxide ($CO_2$) from gas mixtures. In particular, the adsorbents have superior adsorption/desorption characteristics when compared to other adsorbents. Further, the adsorbents have superior cycling stability when compared to other adsorbents.

In addition, layered double hydroxide (LDH) compositions, methods of preparation thereof, and methods of use thereof, are disclosed. In general, the LDH compositions include, but are not limited to, alkali metal promoted, mixed trivalent metal LDH compositions. Under appropriate conditions (e.g., a temperature ranging from 300° C. to 450° C. and a pressure of 1 atmosphere), the LDH compositions can be reversibly converted into the adsorbent described above.

Another embodiment of the present invention provides for methods of using the LDH adsorbents in cycling adsorption processes such as, but not limited to, thermal (temperature) swing adsorption processes, pressure swing adsorption processes, and combinations thereof. In particular, adsorbents are well suited for the adsorption of $CO_2$ and water vapor in thermal swing processes. For example, the adsorbents demonstrate exceptional adsorption/desorption characteristics, which will be discussed in more detail below and in Example 1.

LDH Compositions

Embodiments of the LDH compositions include alkali metal promoted, mixed trivalent metal LDH compositions. In particular, the alkali metal promoted, mixed trivalent metal LDH compositions include compositions having the following general formula:

$[M1_{1-x}(M2_yM3_{(1-y)})_x(OH)_2(A)_{x/2}\cdot zH_2O]\cdot v[M4_wCO_3]$ wherein the subscript "x" is a number between 0 and 1; the subscript "y" is a number ranging from greater than 0 to about 0.05, preferably from greater than 0 to about 0.0375; "z" is a number ranging from 0 to about 8, preferably from 0 to about 4; the subscript "w" is the integer 1 or 2, wherein when "w" is the integer 1 the $CO_3$ becomes $HCO_3$; "v" is a number ranging from 0 to about 0.0, preferably from 0 to 0.0025; "M1" is a divalent metal such as, but not limited to, magnesium (Mg), calcium (Ca), strontium (Sr), manganese (Mn), iron (Fe), cobalt (Co), nickel (Ni), copper (Cu), and zinc (Zn); "M2" and "M3" are each a trivalent metal such as, but not limited to, aluminum (Al), chromium (Cr), Manganese (Mn), Iron (Fe), Cobalt (Co), lanthanum (La), cerium (Ce), galium (Ga), indium (In), the lanthanide series of metals, and mixtures thereof; "A" is an anion such as, but not limited to, $CO_3$, $SO_4$, and $HPO_4$; and "M4" is an alkali metal such as, but not limited to, sodium (Na), potassium (K), robidium (Rb), cesium (Cs), and lithium (Li). In an exemplary embodiment. "M1" is Mg; "M2" is Al, Ga, or La; "M3" is a trivalent metal such as Ga, La. In, or the lanthanide series of metals, at least one of "M2" and "M3" is Al; "M4" is K.

The alkali metal promoted, mixed trivalent metal LDH composition when heated to at least one temperature ranging from about 300° C. to less than 450° C. at a pressure of one atmosphere forms a mixed trivalent metal LDH adsorbent The alkali metal promoted, mixed trivalent metal LDH adsorbent has an adsorption capacity of at least about 0.8 adsorbed per gram of adsorbent when measured by a thermal gravimetric apparatus using a "dry" gas stream containing $CO_2$ (about 0.7 atmosphere partial pressure) and an inert gas. In addition, the alkali metal promoted, mixed trivalent metal LDH adsorbent has a desorption rate, indicated by a first order rate constant, of about 0.05 to 0.24 per minute when measured by a thermal gravimetric apparatus using a dry inert gas stream to purge the sample. Further, the alkali metal promoted, mixed trivalent metal LDH adsorbent has a working capacity of greater than about 0.05 millimoles $CO_2$ per gram of mixed trivalent metal adsorbent. Furthermore, surface area of adsorbent is about 30-50 $m^2/g$ when measured by $N_2$ adsorption in a traditional BET surface area analyzer. Lastly, the alkali metal promoted, mixed trivalent metal LDH composition/adsorbent can be regenerated from one cycle to another in cycling adsorption processes and, thus the alkali metal promoted, mixed trivalent metal LDH adsorbent is cyclically stable.

"Working capacity" means the reversible $CO_2$ capacity that is observed when $CO_2$ is present in a "moist" gas stream when the alkali metal promoted, mixed trivalent metal LDH composition/adsorbent is cycled between the adsorption conditions (e.g., at a temperature of about 200° C. and at a pressure of about 45 psia) and the desorption conditions (e.g., at a temperature of about 450° C. and at a pressure of about 45 psia).

"Cyclic stability" can be defined in terms of how the "working capacity" changes with cycles. An alkali metal promoted, mixed trivalent metal LDH composition/adsorbent is deemed as stable if successive measurements of "working capacity" change by less than a certain tolerance (e.g., the tolerance is set at 6%).

In particular, the alkali metal promoted trivalent metal LDH compositions include gallium-containing mixed trivalent metal compositions having the formula: $[Mg_6Al_{2(1-o)}Ga_{2o}(OH)_{16}CO_3.4H_2O].p(K_2CO_3)$ wherein the subscript "p" can range from greater than 0 to about 0.02 or preferably from greater than 0 to about 0.01; and the subscript "o" can the range from greater than 0 to about 0.3 or preferably from about 0.01 to 0.15. The gallium-containing mixed trivalent metal composition forms a gallium-containing mixed trivalent metal adsorbent when heated to at least one temperature ranging from about 300° C. to less than 450° C. at a pressure of one atmosphere.

The gallium-containing mixed trivalent metal adsorbent has an adsorption capacity of at least about 0.8, at least about 1.1, at least about 1.3, between about 1 and 1.5, and preferably from between about 1.1 and 1.3 Millimoles of $CO_2$ adsorbed per gram of adsorbent when measured by a thermal gravimetric apparatus using a "dry" gas stream containing $CO_2$ (about 0.7 atmosphere partial pressure) and an inert gas.

Further, the gallium-containing mixed trivalent metal adsorbent has a desorption rate, indicated by a first order rate constant, of about 0.12 to 0.24 per minute, and preferably, about 0.14 to 0.22 per minute when measured by a thermal gravimetric apparatus using a dry inert gas stream to purge the sample.

The gallium-containing mixed trivalent metal adsorbent has a working capacity of at least 0.05 millimoles per gram, preferably at least 0.1 millimoles per gram, more preferably at least 0.2 millimoles per gram, and most preferably at least 0.5 millimoles per gram of $CO_2$ per gram of gallium-containing mixed trivalent metal adsorbent.

Another embodiment of the alkali metal promoted mixed trivalent metal LDH compositions includes, but is not limited to, lanthanum-containing mixed trivalent compositions having the formula $[Mg_6Al_{2(1-q)}La_{2q}(OH)_{16}CO_3.4H_2O].r(K_2CO_3)$ wherein the subscript "r" can range from greater than 0 to about 0.02 or preferably from greater than 0 to about 0.01 and the subscript "q" can range from greater than 0 to about 0.1 or preferably from about 0.001 to 0.05. The lanthanum-containing mixed trivalent composition forms a lanthanum-containing mixed trivalent metal adsorbent when heated to at least one temperature ranging from about 300° C. to less than 450° C. at a pressure of one atmosphere.

The lanthanum-containing mixed trivalent metal adsorbent has an adsorption capacity of at least about 0.8, at least about 1.1, at least about 1.5, between about 1 and 1.5, and between about 1 and 1.3 millimoles of $CO_2$ adsorbed per gram of adsorbent when measured by a thermal gravimetric apparatus using a "dry" gas stream containing $CO_2$ (about 0.7 atmosphere partial pressure) and an inert gas.

The lanthanum-containing mixed trivalent metal adsorbent has a desorption rate, indicated by a first order rate constant, of about 0.05 to 0.07 per minute, and preferably about 0.06 to 0.07 per minute when measured by a thermal gravimetric apparatus using a dry inert gas stream to purge the sample.

The lanthanum-containing mixed trivalent metal adsorbent has a working capacity of at least 0.05 millimoles per gram, preferably at least 0.1 millimoles per gram, more preferably at least 0.2 millimoles per gram, and most preferably at least 0.5 millimoles per gram of $CO_2$ per gram of lanthanum-containing mixed trivalent metal adsorbent.

Methods of Preparing LDH Compositions

The exemplary alkali metal promoted, mixed trivalent metal LDH compositions discussed above can be synthesized by mixing divalent and trivalent metal-containing chloride, carbonate, or nitrate compound with a trivalent-containing chloride, carbonate, or nitrate compound in a solution of aqueous alkali metal carbonate such as, but not limited to, sodium carbonate. The solution is mixed and maintained at a pH of about 10 by adding a base such as, but not limited to, sodium hydroxide to the mixture. If the starting compounds are chlorides, the resulting precipitate, (the mixed, trivalent metal LDH composition) is rinsed of chloride ions using distilled and/or decarbonated water under appropriate conditions. The mixed trivalent metal LDH composition is then dried, crushed, and stored under appropriate conditions. The mixed trivalent metal LDH composition can be a LDH chloride compound, a LDH carbonate compound, or a LDH nitrate compound. In an exemplary embodiment, the mixed trivalent metal LDH composition is a LDH carbonate compound.

Subsequently, the mixed trivalent metal LDH composition is promoted with an alkali-metal carbonate such as, but not limited to, potassium carbonate. The trivalent metal LDH composition is added to a solution of water to which an amount of the alkali-metal carbonate is added. In general, about 1 mole of potassium carbonate is added per 2 moles of trivalent cations in the mixed trivalent metal LDH composition. For example, the $K:M^{3-}$ ratio of the starting materials can be 1:1. The alkali metal promoted, mixed trivalent metal LDH composition is separated from the solution dried, crushed, and stored under appropriate conditions.

The concentrations and quantities of the materials used in the synthesis of the alkali metal promoted, mixed trivalent metal LDH composition depend in part upon the alkali metal promoted, mixed trivalent metal LDH composition formed, as defined above. In general, the stoichiometric ratio of the metal chlorides, carbonates, or nitrates used in the synthesis of the alkali metal promoted, mixed trivalent metal LDH composition, was held at $M^{2+}:M^{3+}$ of 3:1. For example, when referring to the instance of 10% substitution of Ga for Al, the ratio of Mg:Al:Ga of the synthesis materials is 3:0.9:0.1. However, one skilled in the art would be able to determine the concentrations and quantities of the materials, and the stoichiometric ratios needed to synthesize the alkali metal promoted, mixed trivalent metal LDH composition described above.

Methods of Using LDH Compositions and the Corresponding Adsorbents

Embodiments of the present invention also include methods of separating one or more gases from a gas mixture using a cyclic adsorption process. In general, the cyclic adsorption process can be carried out in one of the following cyclic adsorption process configurations: a pressure swing adsorption apparatus, a temperature swing adsorption apparatus, or a pressure swing/temperature swing adsorption apparatus, all of which are known in the art. In general, each type of cyclic adsorption apparatus includes an adsorption zone and a desorption zone, although in some instances both zones are in the same physical area and the conditions within the physical area are altered, as is discussed in more detail below.

In general, the adsorption zone can include adsorption units such as, but not limited to, adsorption beds or a rotating kiln unit. The adsorption beds and the rotating kiln include at least one type of LDH compositions and the corresponding adsorbents (hereinafter "LDH composition/adsorbent") as described above, which are capable of adsorbing one or more gases from the gas mixture.

The adsorption beds can be configured as fluidized-beds, moving-beds, or fixed-beds. In the fluidized-beds configuration, the LDH composition/adsorbent is contacted countercurrently with the gas stream on perforated trays in relatively shallow adsorption beds. The gas uniformly distributes over the bottom cross section of the adsorbent bed. Due to momentum transfer, the bed expands and the solid particles move freely and circulate through the adsorption zone into the desorption zone.

In the moving-beds configuration, both the LDH composition/adsorbent (in an adsorption bed) and the gas mixture move through the adsorption zone in a continuous manner. Then the LDH composition/adsorbent is moved from the adsorption zone into the desorption zone.

In the fixed-beds configurations, the bed is fixed in a certain area of the cyclic adsorption apparatus and contains the LDH composition/adsorbent. The gas mixture passes through the fixed-bed while under adsorption zone conditions. After a period of time when the LDH composition/adsorbent adsorbs a portion of the gas mixture, the conditions are changed in the area that includes the fixed-bed to desorption zone conditions to desorb the adsorbed gases. In this regard, many cyclic adsorption apparatus configurations include two or more fixed-beds in separate regions of the apparatus, so that while one fixed-bed is under adsorption conditions, the other fixed-bed is under desorption conditions. Therefore, the gas stream can be operated in a continuous manner.

An embodiment of a representative temperature swing method includes passing the gas mixture stream through at least one adsorption zone of the cyclic adsorption process that contains the LDH composition. Prior to being exposed to the gas mixture, the LDH composition is calcined at a temperature of about 350° C. to 450° C. in an inert gas. The gas mixture can include a plurality of gases such as, but not limited to, $CO_2$, water vapor, hydrocarbons, carbon monoxide, hydrogen ($H_2$), nitrogen ($N_2$), and oxygen ($O_2$). The hydrocarbons can include mixtures of light hydrocarbons such as, but are not limited to, naphtha, methane, ethane, ethene, or combinations thereof.

Exposure of the gas mixture for an appropriate time period at an appropriate temperature and pressure causes the adsorbent to be reversibly converted into the corresponding LDH composition. The time period can range from 0.25 to 18 hours, 0.25 to 1 hour, or 0.2 to 0.5 hours. In addition, the time period that the adsorbent is exposed to the gas mixture depends upon, but is not limited to, the operating conditions of the cyclic adsorption process, the gas mixture, the concentration of $CO_2$ in the gas mixture, and the concentration of water vapor in the gas mixture. One skilled in the art can determine the most appropriate time period for a particular set of conditions. It should be noted that saturation of the adsorbent is not necessary and one skilled in the art could design the cyclic adsorption process to effectively use the adsorbent.

Subsequently, the LDH composition is heated to a temperature (e.g., 300° C. to less than 450° C.) to desorb a substantial portion of the $CO_2$ and water vapor. The LDH composition can be heated using a heated gas stream (e.g., water vapor and/or a heated inert gas) and/or heating the adsorption zone with heaters. After the $CO_2$ and water vapor are desorbed from the LDH composition, the water vapor can be separated from the $CO_2$ to form a concentrated $CO_2$ gas stream. In addition, the LDH composition can be calcined to reform the adsorbent, so that it can be used again in the cyclic process.

The adsorption cycle can include steps other than the basic steps described above. For example, pressure swing adsorption cycles can include one or more bed equalization steps, a nonadsorbed product backfill step, a countercurrent nonadsorbed product purge step, and/or a concurrent desorbed product gas purge step at or below the desired adsorption pressure. The concurrent purge generally precedes the evacuation step, and is generally carried out before depressurizing the adsorption vessel, although it could be carried out after any concurrent depressurization steps (e.g., equalization steps). Countercurrent purge is generally carried out during or after countercurrent evacuation of the adsorption vessel. The sequential order and duration of the various steps are not critical, and these may be varied, as desired. Similarly, the LDH composition may be purged with nonadsorbed gas during the adsorbent regeneration step of thermal swing adsorption cycles.

As described above, the cyclic adsorption processes can be carried out in a system having a single adsorption zone or a battery of adsorption zones operated in phase, or a plurality of adsorption zones or batteries of adsorption zones operated out of phase. When a process having a single adsorption zone or a battery of zones, all of which are operated in phase, the adsorption step must be periodically stopped to permit regeneration of the LDH composition. In contrast, when a plurality of adsorption zones are employed in parallel and operated out of phase, one or more adsorption zones can be in adsorption service adsorbing the desired gas component, while one or more other zones are undergoing regeneration to desorb and collect the adsorbed gas component. In the preferred adsorption process, cycles are repeatedly carried out in a manner such that production of the desired product gas is substantially continuous.

In general for TSA processes, the temperature in the adsorption zone is lower than the temperature in the desorption zone, while the pressure is substantially constant. For PSA processes the pressure in the adsorption zone is greater than the pressure of the desorption zone, while the temperature is substantially constant.

The temperature of the adsorption zone for cyclic adsorption processes depends upon a number of factors, such as, but not limited to, the particular hydrocarbons present in the gas mixture being separated, the particular adsorbent being used, and the pressure at which the adsorption step is carried out. The upper and lower temperatures at which the adsorption zone is maintained is, in part, determined by both economics and the chemical reactivity of the components in the gas mixture. In particular, the temperature at which the adsorption zone is maintained should be below the temperature at which the gas mixture components undergo chemical reaction (e.g., hydrocarbons undergoing oligomerization and polymerization). In general, the temperature in the adsorption zone is in the range of about 0° C. to 250° C., preferably in the range of about 100° C. to 200° C., and most preferably in the range of about 100° C. to 160° C., when $CO_2$ is being separated from hydrocarbons such as, but not limited to, alkanes, alkenes, or mixtures of these. However, one skilled in the art would be able to adjust the temperature, as well as other parameters in the cyclic adsorption process, to ensure efficient and effective adsorption of $CO_2$.

For TSA processes, adsorbent regeneration is carried out at a temperature higher than the adsorption temperature and below the temperature at which undesired reactions of the components of the gas mixture take place. For TSA processes, the adsorbent regeneration temperature is typically in the range of about 100° C. to less than about 450° C., and is preferably in the range of about 350° C. to about 400° C. The pressures at which the adsorption and adsorbent regeneration steps are carried out are not critical for TSA processes, and in general, these steps can be carried out at any of the usual pressures employed for cyclic adsorption processes.

For PSA processes, the pressure maintained in the adsorption zone is typically in the range of about 760 (1 atmosphere (atm)) to about 15×760 torr (15 atm), and preferably in the range of about 5×760 to about 10×760 torr. The pressure maintained in the desorption zone is typically carried out at pressures in the range of about 115 to about 760 torr and preferably carried out at pressures in the range of about 50 to about 200 torr.

It will be appreciated that it is within the scope of the present invention to utilize conventional equipment to perform the various functions of the cyclic processes, such as but not limited to, monitoring and automatically regulating the flow of gases within the cyclic adsorption system so that it can be fully automated to run continuously in an efficient manner.

EXAMPLE 1

The following is a non-limiting illustrative example of an embodiment of the present invention. This example is not intended to limit the scope of any embodiment of the present invention, but rather is intended to provide specific experimental conditions and results. Therefore, one skilled in the art would understand that many experimental conditions can be modified, but it is intended that these modifications are within the scope of the embodiments of the present invention.

Three exemplary adsorbents were prepared as follows: Example 1 having the formula $[Mg_6Al_{2(1-o)}Ga_{2o}(OH)_{16}CO_3.4H_2O].p(K_2CO_3)$, Example 2 having the formula $[Mg_6Al_{2(1-q)}La_{2q}(OH)_{16}CO_3.4H_2O].r(K_2CO_3)$, and Comparative Example 1 which is a potassium promoted $Mg_6Al_2(OH)_{16}CO_3.4H_2O$ (prepared at by the inventors). The samples were prepared in a manner consistent with the methodology described above.

In particular for Example 1, the stoichiometric ratio of the metal chlorides used in the synthesis of the layered double hydroxide, was held at $M^{2+}:M^{3+}$ of 3:1. For example, when referring to the instance of 10% substitution of gallium for aluminum, the ratio of Mg:Al:Ga of the synthesis materials is 3:0.9:0.1. Substitution of gallium for aluminum spanning the range up to 100% substitution were performed analogous to the protocol described in Comparative Example 1 below, with the exception of replacement of gallium for a percentage of the aluminum in the starting materials. That is, a fraction, o of 50 ml of 1.20 M aluminum(III) chloride hexahydrate and another fraction, (1-"o") of 50 mL of 1.2 M gallium(III) chloride hydrate and fifty ml of 0.40 M magnesium(III) chloride hexahydrate were combined and added dropwise to 150 ml of 0.13 M aqueous sodium carbonate maintained at 60° C. under vigorous stirring.

The pH of the solution was maintained at 10.0 by periodically adding aliquots of a 1.0 M sodium hydroxide mixture. After 2.0 hours of aging at 60° C. under vigorous stirring, the mixture was heated to 80° C. and mixed for 24 hours. The resulting white precipitate was filtered and rinsed using copious distilled water in order to remove excess chloride ion. The supernatant was tested for chloride ion using a 0.1 M silver nitrate solution. In all cases, the supernatant tested positive for chloride ion. In order to further exchange chloride anion for carbonate anion, the collected precipitate was refluxed for 2.0 hours in 500 ml of 0.02 molar sodium carbonate solution. The precipitate was then filtered and rinsed using copious distilled water. The supernatant was tested for chloride ion using the silver nitrate test. If the supernatant tested positive for chloride ion, the reflux was repeated. The precipitate was filtered, rinsed thoroughly, and the supernatant tested for chloride ion. The LDH was dried at 100° C. in an oven for 24 hours, crushed, and stored in glass vials.

In order to promote the various LDHs with potassium carbonate, approximately 1.0 gram of LDH was added to 50 ml of water. Potassium carbonate was added in the amount of 1 mole of potassium carbonate per 2 mole of trivalent LDH cations. Thus, the $K:M^{3+}$ ratio of the starting materials was 1:1. The solution was stirred for two hours, ant the water was removed using a Rotovap, keeping the bath temperature at 70° C. under a slight vacuum. The potassium carbonate promoted LDH was then removed from the flask, dried, crushed, and stored in glass vials.

For Example 2, the stoichiometric ratio of the metal chlorides used in the synthesis of the layered double hydroxide, was held at $M^{2+}:M^{3+}$ of 3:1. For example, when referring to the instance of 10% substitution of lanthanum for aluminum, the ratio of Mg:Al:La of the synthesis materials is 3:0.9:0.1. Substitution of lanthanum for aluminum spanning the range up to 100% substitution were performed analogous to the protocol described in Comparative Example 1 below, with the exception of replacement of lanthanum for a percentage of the aluminum in the starting materials. That is, a fraction, q of 50 ml of 1.20 M aluminum(III) chloride hexahydrate and another fraction, (1-q) of 50 mL of 1.2 M lanthanum(III) chloride hydrate and fifty ml of 0.40 M magnesium(III) chloride hexahydrate were combined and added dropwise to 150 ml of 0.13 M aqueous sodium carbonate maintained at 60° C. under vigorous stirring.

The pH of the solution was maintained at 10.0 by periodically adding aliquots of a 1.0 M sodium hydroxide mixture. After 2.0 hours of aging at 60° C. under vigorous stirring, the mixture was heated to 80° C. and mixed for 24 hours. The resulting white precipitate was filtered and rinsed using copious distilled water in order to remove excess chloride ion. The supernatant was tested for chloride ion using a 0.1 M silver nitrate solution. In all cases, the supernatant tested positive for chloride ion. In order to further exchange chloride anion for carbonate anion, the collected precipitate was refluxed for 2.0 hours in 500 ml of 0.02 molar sodium carbonate solution. The precipitate was then filtered and rinsed using copious distilled water. The supernatant was tested for chloride ion using the silver nitrate test. If the supernatant tested positive for chloride ion, the reflux was repeated. The precipitate was filtered, rinsed thoroughly, and the supernatant tested for chloride ion. The LDH was dried at 100° C. in an oven for 24 hours, crushed, and stored in glass vials.

In order to promote the various LDHs with potassium carbonate, approximately 1.0 gram of LDH was added to 50 ml of water. Potassium carbonate was added in the amount of 1 mole of potassium carbonate per 2 mole of trivalent LDH cations. Thus, the $K:M^{3-}$ ratio of the starting materials was 1:1. The solution was stirred for two hours, and the water vas removed using a Rotovap, keeping the bath temperature at 70° C. under a slight vacuum. The potassium carbonate promoted LDH was then removed from the flask, dried, crushed, and stored in glass vials.

For Comparative Example 1, fifty ml of 1.20 M aluminum (III) chloride hexahydrate and fifty ml of 0.40 M magnesium (III) chloride hexahydrate were combined and added dropwise to 150 ml of 0.13 M aqueous sodium carbonate maintained at 60° C. under vigorous stirring. The pH of the solution was maintained at 10.0 by periodically adding aliquots of a 1.0 M sodium hydroxide mixture. After 2.0 hours of aging at 60° C. under vigorous stirring, the mixture was heated to 80° C. and mixed for 24 hours. The resulting white precipitate was filtered and rinsed using copious distilled water in order to remove excess chloride ion. The supernatant was tested for chloride ion using a 0.1 M silver nitrate solution. In all cases, the supernatant tested positive for chloride ion. In order to further exchange chloride anion for carbonate anion, the collected precipitate was refluxed for 2.0 hours in 500 ml of 0.02 molar sodium carbonate solution. The precipitate was then filtered and rinsed using copious distilled water. The supernatant was tested for chloride ion using the silver nitrate test. If the supernatant tested positive for chloride ion, the reflux was repeated. The precipitate was filtered, rinsed thoroughly, and the supernatant tested for chloride ion. The LDH was dried at 100° C. in an oven for 24 hours, crushed, and stored in glass vials.

In order to promote the various LDHs with potassium carbonate, approximately 1.0 gram of LDH was added to 50 ml of water. Potassium carbonate was added in the amount of 1 mole of potassium carbonate per 2 mole of trivalent LDH cations. Thus, the K:$M^{3+}$ ratio of the starting materials was 1:1. The solution was stirred for two hours, and the water was removed using a Rotovap, keeping the bath temperature at 70° C. under a slight vacuum. The potassium carbonate promoted LDH was then removed from the flask, dried, crushed, and stored in glass vials.

The exemplary compositions are converted into their respective adsorbent by calcining the LDH composition at a temperature of about 400° C. The experiments were conducted at a temperature of about 400° C. and the $CO_2$ partial pressure was 0.7 atm. The adsorption capacities were obtained via using a thermal gravimetric apparatus using a "dry" gas stream containing $CO_2$ (about 0.7 atmosphere partial pressure) and an inert gas and are provided in FIG. 1.

Figure 1:
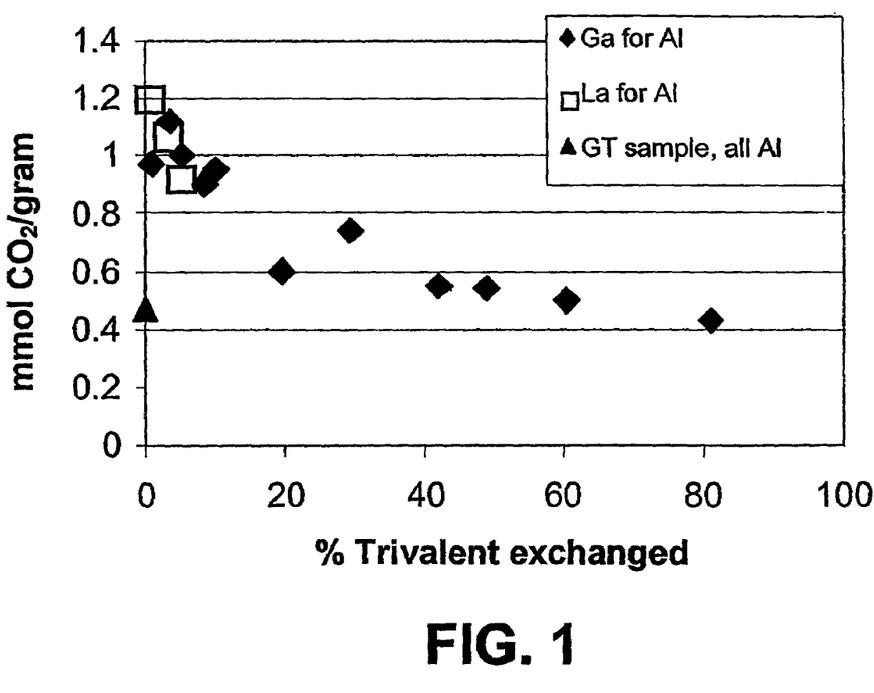
FIG. 1 Illustrates the pressure swing adsorption capacity of various layered double hydroxide adsorbents.

FIG. 1 illustrates that the pressure swing adsorption capacity of the adsorbent corresponding to Example 1 is as much as 100% greater than the adsorbent corresponding to Comparative Example when o is in the range from 0.025 to 0.05.

In addition, FIG. 1 illustrates that the pressure swing adsorption capacity of the adsorbent corresponding to Example 2 is as much as 100% greater than the adsorbent corresponding to Comparative Example 1 when q is in the range from 0.01 to 0.025.

The above described adsorbents corresponding to Examples 1 and 2 are advantageous because of their high adsorption capacity and longer life cycle in adsorption processes. It should be noted the high adsorption capacity of the adsorbents corresponding to Examples 1 and 2 occurs while the surface area of these adsorbents decreases.

EXAMPLE 2

The following is a non-limiting illustrative example of an embodiment of the present invention. This example is not intended to limit the scope of any embodiment of the present invention, but rather is intended to provide specific experimental conditions and results. Therefore, one skilled in the art would understand that many experimental conditions can be modified, but it is intended that these modifications are within the scope of the embodiments of the present invention.

Four exemplary adsorbents were prepared (in a manner consistent with those methods described herein) and examined: LDH compositions having Mg/Al in a 3/1 ratio, (1) promoted with $K_2CO_3$ and (2) unpromoted; LDH compositions having Mg/Al/Ga in a 3/0.9/0.1 ratio, (3) promoted with $K_2CO_3$ and (2) unpromoted; and LDH compositions having Mg/Al/Ga in a 3/0.9/0.1 ratio, (3) promoted and (4) unpromoted. These samples (0.2 g each) were placed in a fixed bed adsorber operated at a total pressure of 30 psia that was installed in a controlled furnace.

Inert gas (He, 30 STP $cm^3$/minute) was passed over this solid and thence to a $CO_2$ analyzer to analyze for the $CO_2$ concentration in the effluent gas. Data of $CO_2$ concentrations, as a function of time, were recorded by a PC stored for further processing. The temperature of the adsorbent bed was heated from 100 to 450° C. at a linear rate of 2° C./minute, and then the temperature was held constant for 30 minutes so that the LDH is to be fully converted to the calcined solid.

Next, the solid was cooled quickly to 200° C. and the inlet gas switched to a mixture of He/Ar/$H_2O$/$CO_2$=90/1/6/3 mol % at the same flow rate (30 STP $cm^3$/minute) for a period of 24 hours during which the calcined solid would be partially reconstructed to the LDH. This mixture produced the following partial pressures when the total pressure is 30 psia: $H_2O$=138 Torr, $CO_2$=69 Torr. Since the space-time was short under the prevailing conditions, the $CO_2$ "broke through" the adsorbent bed in just a few minutes, but the exposure was continued for at least three hours. Additional testing showed that the $CO_2$ uptake was invariant for exposure times greater than 3 hours. The purpose of these tests was to determine the reversible $CO_2$ capacity and not to describe the adsorption kinetics.

Next, the gas stream was switched back to inert He at the same flow rate and total pressure. This solid was heated in a linear rate, 2° C./minute, from 200 to 500° C. and held at this temperature for 30 minutes. This cycle of adsorption and desorption was repeated for up to 3 cycles.

The calcined solids developed by thermolysis of the LDH samples were subsequently exposed to a moist stream of He/Ar/$CO_2$ at 200° C. and a pressure of 30 psia for 24 hours. This solid was then heated to 500° C. at a linear rate (2° C./minute) and the $CO_2$ composition of the evolved gas was recorded as a function of time for the four samples. The temperature of the sample was also recorded on the same figure and the samples were cycled through either 2 or 3 cycles of adsorption followed by desorption into inert He stream and readsorption of $CO_2$ ($P_{co2}$=69 Torr) from the moist stream ($P_{H2O}$=138 Torr) described above at the same conditions; 200° C. at 30 psia for 24 hours.

The desorption of $CO_2$ for the unpromoted samples occurred at a single temperature of 350° C. For the sample containing no Ga (#1), the amount of $CO_2$ desorbed decreased with cycle number; however, the Ga-containing sample (#2, 10 mol % Ga) showed more $CO_2$ desorption that does not decrease with cycle number after the first cycle. The K-promoted samples showed two desorption peaks at 340 and 450° C. that resulted in large, reversible $CO_2$ sorption capacities. The areas under the $CO_2$ concentration versus time curves were integrated to obtain the reversible $CO_2$ sorption capacities as shown in Table 1. The sample without Ga (#3) showed a decreasing, reversible sorption capacity with cycle number; whereas the Ga-containing sample (#4) showed slightly greater $CO_2$ capacity, and this capacity was almost constant with cycle number, decreasing by only 4% after 3 cycles. The Ga-containing sample (#4) has a cyclic stability since the workinig capacity changes less than a 6% tolerance

TABLE 1

CO$_2$ Reversible Sorption Capacities
under Temperature Swing Operations

| | millimoles CO$_2$ Evolved/g LDH Cycle # | | |
|---|---|---|---|
| Sample | (1) | (2) | (3) |
| (1) Unpromoted, No Ga | 0.099 | 0.058 | — |
| (2) Unpromoted, 10% Ga | 0.17 | 0.16 | 0.143 |
| (3) K-Promoted, No Ga | 0.57 | 0.52 | — |
| (4) K-promoted, 10% Ga | 0.58 | 0.57 | 0.55 |

The data in the table above were developed from a consideration of the amount of CO$_2$ evolved during the desorption step. These results show that the process to cycle the adsorbent is a viable means to remove carbon dioxide from a process stream and to concentrate it in a separate stream using a temperature swing adsorption/desorption process.

The adsorption capacity for adsorption/desorption cycles in an atmosphere where water vapor is also present in addition to CO$_2$ and inert gas. The cycles are defined as follows:

a) Adsorption—the solid adsorbent is held at a temperature of 200° C. while the gas stream (P$_{CO2}$=2.7 psia, P$_{H2O}$=1.35 psia, P$_{total}$=45 psia) for at least 1 hour to ensure that the sample has taken up an amount of CO$_2$/water that is its maximum capacity.

b) Desorption—the gas stream is switched to an inert gas at a total pressure of 45 psia, and the temperature of the solid is increased from 200 to 450° C. at a rate of 10° C./minute. This temperature is held at 450° C. for 1 hour before the solid is cooled back to 200° C. to start another adsorption cycle.

It should also be noted that specific surface area, as measured by the BET surface area technique, of the samples having Ga incorporated therein decrease, as shown in Table 2 below.

TABLE 2

Surface Area of Various LDH's Before and After Calcining

| Sample | BET Surface Area (m$^2$/gram) |
|---|---|
| 0% Ga, LDH | 85.6 (±0.30) |
| 0% Ga, Calcined | 211 (±0.97) |
| 5% Ga, LDH | 44.0 (±0.29) |
| 5% Ga, Calcined | 58.7 (±0.71) |
| 10% Ga, LDH | 34.2 (±0.37) |
| 10% Ga, Calcined | 45.8 (±0.71) |

The term LDH means the layered double hydroxide before it was calcined. The term calcined means that the LDH was heated to 450° C. in order to convert it into the adsorbent solid. All of these samples had been also promoted with potassium from its carbonate. Notice how the specific surface area, as interrogated by the introduction of nitrogen gas to the sample at 77 K for total pressures less than 1 atm., decreased when Ga was incorporated in the sample.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An adsorbent comprising an alkali metal promoted, mixed trivalent layered double hydroxide (LDH) composition, wherein the mixed trivalent layered double hydroxide (LDH) composition is heated to a temperature ranging from about 300° C. to 450° C. to provide the adsorbent, and wherein the alkali metal promoted, mixed trivalent metal LDH composition has the following general formula:

[M1$_{1-x}$(M2$_y$M3$_{(1-y)}$)$_{x(OH)2}$(A)$_{x/2}$·z H$_2$O].v [M4$_w$CO$_3$]

wherein the subscript "x" is a number between 0 and 1; the subscript "y" is a number ranging from greater than 0 to about 0.05; "z" is a number ranging from 0 to about 8; the subscript "w" is the integer 1 or 2, wherein when "w" is the integer 1 the CO$_3$ becomes HCO$_3$; "v" is a number ranging from 0 to about 0.01; "M1" is a divalent metal selected from magnesium (Mg), calcium (Ca), strontium (Sr), manganese (Mn), iron (Fe), cobalt (Co), nickel (Ni), copper (Cu), and zinc (Zn); "M2" and "M3" are each a trivalent metal selected from aluminum (Al), chromium (Cr), Mn, Fe, Co, lanthanum (La), cerium (Ce), galium (Ga), indium (In), the lanthanide series of metals, and mixtures thereof; "A" is an anion selected from CO$_3$, SO$_4$, and HPO$_4$; and "M4" is an alkali metal selected from sodium (Na), potassium (K), robidium (Rb), cesium (Cs), and lithium (Li).

2. The adsorbent of claim 1, wherein "M1" is Mg.

3. The adsorbent of claim 1, wherein "M2" is selected from Al, Ga, and La.

4. The adsorbent of claim 1, wherein "M3" is a trivalent metal selected from Ga, La, In, and the lanthanide series of metals.

5. The adsorbent of claim 1, wherein at least one of "M2" and "M3" is Al.

6. The adsorbent of claim 1, wherein "M4" is K.

7. The adsorbent of claim 1, wherein the alkali metal promoted, mixed trivalent layered double hydroxide (LDH) composition is represented by the formula:

[Mg$_6$Al$_{2(1-o)}$Ga$_{2o}$(OH)$_{16}$CO$_3$.4H$_2$O].p(K$_2$CO$_3$), wherein p is in the range from greater than 0 to about 0.02, and wherein o is in the range from greater than 0 to about 0.3.

8. The adsorbent of claim 1, wherein the alkali metal promoted, mixed trivalent layered double hydroxide (LDH) composition is represented by the formula:

[Mg$_6$Al$_{2(1-q)}$La$_{2q}$(OH)$_{16}$CO$_3$.4H$_2$O].r(K$_2$CO$_3$), wherein r is in the range from greater than 0 to about 0.02, and wherein q is in the range from greater than 0 to about 0.1.

9. The adsorbent of claim 1, wherein the adsorbent has a working capacity of at least about 0.05 millimoles CO$_2$ per gram of adsorbent.

10. The adsorbent of claim 1, wherein the adsorbent has a working capacity of at least 0.5 millimoles per gram CO$_2$ per gram of adsorbent.

11. A method of separating carbon dioxide from a gas mixture comprising carbon dioxide and water vapor, the method comprising:

providing at least one adsorption zone comprising an alkali metal promoted, trivalent metal layered double hydroxide (LDH) adsorbent having an adsorption capacity of at least 0.8 millimoles of CO$_2$ adsorbed per gram of LDH adsorbent;

passing the gas mixture comprising water vapor and carbon dioxide through the at least one adsorption zone wherein the alkali metal promoted, mixed trivalent metal LDH adsorbent adsorbs at least part of the carbon dioxide from the mixture to provide a carbon dioxide-depleted gas; and regenerating the alkali metal promoted trivalent metal LDH adsorbent to provide a a carbon dioxide-rich gas.

12. The method of claim 11, wherein the passing step is at least one process selected from pressure swing adsorption, temperature swing adsorption, and combinations thereof.

13. The method of claim 11, wherein the adsorption zone comprises at least one member selected from a single adsorption bed, a plurality of adsorption beds, a rotating kiln adsorption unit, and combinations thereof.

14. The method of claim 11, wherein the gas mixture further comprises at least one gas selected from hydrocarbons, carbon monoxide, $H_2$, $O_2$, $N_2$, and combinations thereof.

15. The method of claim 14, wherein the gas mixture comprises at least one hydrocarbon selected from naphtha, methane, ethane, ethene, and combinations thereof.

16. A method of separating carbon dioxide from a gas mixture using an adsorption process comprising:

passing the gas mixture comprising water vapor through at least one adsorption zone comprising an alkali metal promoted, mixed trivalent metal layered double hydroxide (LDH) adsorbent wherein the adsorption zone being at a first temperature and a first pressure, and wherein the alkali metal promoted, mixed trivalent metal LDH adsorbent adsorbs at least part of the carbon dioxide from the gas mixture;

separating a portion of the carbon dioxide from the gas mixture to form a carbon dioxide-depleted gas; and regenerating the alkali metal promoted, mixed trivalent metal LDH adsorbent, wherein the adsorption zone being at a second temperature and a second pressure.

17. The method of claim 16, wherein the adsorption process is a cyclic adsorption process.

18. The method of claim 16, wherein the cyclic adsorption process is selected from a pressure swing adsorption process, a temperature swing adsorption process, and combinations thereof.

19. The method of claim 16, wherein the first temperature is less than the second temperature.

20. The method of claim 16, wherein the first pressure is greater than the second pressure.

* * * * *

UNITED STATES PATENT AND TRADEMARK OFFICE
CERTIFICATE OF CORRECTION

PATENT NO.       : 7,442,232 B2
APPLICATION NO.  : 10/518188
DATED            : October 28, 2008
INVENTOR(S)      : White et al.

It is certified that error appears in the above-identified patent and that said Letters Patent is hereby corrected as shown below:

Column 1, line 12, delete "and, U.S." and replace with

--and U.S.--

Column 1, line 16, delete "60/449,689 both" and replace with

--60/449,689, both--

Column 4, line 40, delete "embodiment."M1" " and replace with

--embodiment, "M1"--

Column 4, line 42, delete "La. In" and replace with

--La, In--

Column 5, line 20, delete "can the" and replace with

--can--

Column 7, line 6, delete "compositions" and replace with

--composition--

Column 7, line 22, delete "composition)/adsorbent" and replace with

--composition/adsorbent--

Column 10, line 17, delete "ant" and replace with

--and--

UNITED STATES PATENT AND TRADEMARK OFFICE
CERTIFICATE OF CORRECTION

PATENT NO.        : 7,442,232 B2
APPLICATION NO.   : 10/518188
DATED             : October 28, 2008
INVENTOR(S)       : White et al.

It is certified that error appears in the above-identified patent and that said Letters Patent is hereby corrected as shown below:

Column 15, line 5, delete "provide a a carbon" and replace with

--provide a carbon--

Signed and Sealed this

Tenth Day of February, 2009

JOHN DOLL
*Acting Director of the United States Patent and Trademark Office*